UNITED STATES PATENT OFFICE.

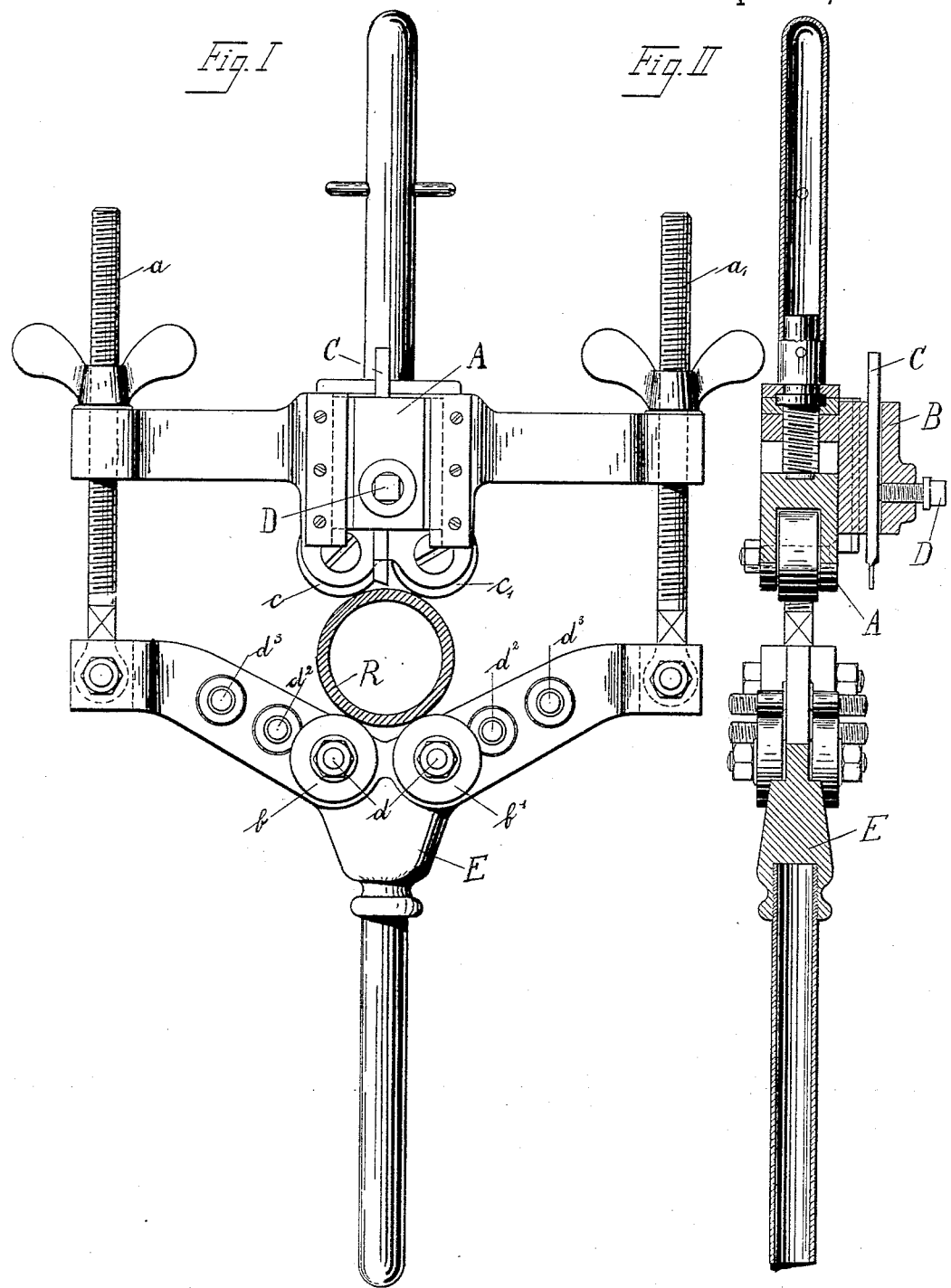

FELIX JUNGMANN, OF BERLIN, GERMANY.

TUBE-CUTTER.

SPECIFICATION forming part of Letters Patent No. 504,786, dated September 12, 1893.

Application filed September 16, 1892. Serial No. 446,118. (No model.)

*To all whom it may concern:*

Be it known that I, FELIX JUNGMANN, a subject of the Emperor of Germany, residing at Berlin, in the Empire of Germany, have invented certain new and useful Improvements in Tube-Cutters, of which the following is a full, clear, and exact description, reference being had to the accompanying drawings, in which—

Figure 1 is a front elevation of my improved device with the tube in cross section. Fig. 2 is a section on line $x$—$x$ of Fig. 1.

The frame of the cutter is composed of two parts, the head A, and the handle portion E, adjustably connected to allow the device to be adjusted to fit different sizes of tubes. The means for connecting the two portions consist of the two screw threaded bolts $a$, $a'$, pivoted to the diverging arms of the handle E, and passing through openings in the outer ends of the head A, where they are provided with thumb nuts by means of which the head and handle may be caused to approach each other, or drawn apart as desired. The handle portion E, is provided with a series of holes $d'$, $d^2$, $d^3$ upon each side of the center thereof, these holes being adapted to receive the bolts $d$, upon which are mounted the rollers $b'$, of any ordinary or desired form. These rollers are adapted to be mounted in any of the series of holes, and when small tubes are to be cut they are mounted as shown in Fig. 1, but where larger tubes are to be operated upon they may be moved to either the holes $d^2$ or $d^3$ as desired. The head is enlarged at its central portion and is cut away to form a space or way in which travels a sliding block or support B in which is carried the cutter C. A handle F, is provided passing through the wall of the head and being keyed therein to prevent its withdrawal, and this handle is provided with a screw threaded portion $f$, which passes through a correspondingly screw threaded opening $f'$ of the cutter support B. It will thus be seen that by rotating the handle in one direction or the other, the cutter may be advanced or retracted according to the direction in which the handle is turned. The cutter slides in a slot in the support and is adapted to be held therein by means of a set screw D. In the lower portion of the head are journaled the two bearing rollers $c$, $c'$, these being similar in construction to the rollers $b$, $b'$, &c., except that they are not removable ordinarily. The end of the handle F, is preferably seated in the portion of the head which carries the rollers as shown in Fig. 2 to give rigidity.

From the above description of the invention the operation will be readily understood. The pipe to be divided is inserted between the two sets of rollers as shown in Fig. 1, after which the thumb screws upon the rods $a$, $a'$, are tightened until the rollers bear firmly against the pipe. The handle F, is then turned to force the sliding block downward causing the cutter to come in contact with the periphery of the pipe, after which the device is revolved around the pipe causing the point to the cutter to cut or groove the periphery of the pipe. After each revolution the cutter may be advanced slightly by giving the handle F, a partial turn.

Having thus described my invention, what I claim is—

1. A tube cutter comprising the handle portion having diverging arms with bearing rollers carried thereby, a head portion or bar having its ends adjustably and detachably connected to the diverging arms and provided with bearing rollers and a suitable cutter carried by said head portion, substantially as described.

2. A tube cutter comprising the handle portion having diverging arms provided with a series of openings, a pair of rollers removably journaled in said openings, a head bar having its ends adjustably connected to the handle portion and provided with bearing rollers and a cutter carried by said head portion, substantially as described.

In witness whereof I have hereunto set my hand in presence of two witnesses.

FELIX JUNGMANN.

Witnesses:
 PAUL FISCHER,
 PAUL BRINKMAN.